(12) United States Patent
Smetana et al.

(10) Patent No.: US 8,663,059 B2
(45) Date of Patent: Mar. 4, 2014

(54) AUTOMOTIVE VEHICLE TRANSMISSION DEVICE COMPRISING A SUPPORTING PIN

(75) Inventors: Tomas Smetana, Herzogenaurach (DE); Ramon Jurjanz, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/588,756

(22) Filed: Aug. 17, 2012

(65) Prior Publication Data

US 2013/0053203 A1 Feb. 28, 2013

(30) Foreign Application Priority Data

Aug. 31, 2011 (DE) .......................... 10 2011 081 882

(51) Int. Cl.
*F16H 57/08* (2006.01)
(52) U.S. Cl.
USPC .......................................................... 475/331
(58) Field of Classification Search
None
See application file for complete search history.

(56) References Cited

U.S. PATENT DOCUMENTS

| | | | |
|---|---|---|---|
| 3,527,121 A | 9/1970 | Moore | |
| 6,585,620 B1 * | 7/2003 | Bae | 475/331 |
| 7,316,629 B2 * | 1/2008 | Nakagawa et al. | 475/331 |
| 2011/0275477 A1 * | 11/2011 | Hsieh et al. | 475/331 |

FOREIGN PATENT DOCUMENTS

| | | |
|---|---|---|
| DE | 10 2005 006 649 A1 | 9/2005 |
| DE | 10 2005 029 537 A1 | 12/2005 |
| DE | 11 2005 001 867 B4 | 3/2011 |
| JP | 2008 089051 A | 4/2008 |
| JP | 2010 077 985 A | 4/2010 |

\* cited by examiner

*Primary Examiner* — Dirk Wright
(74) *Attorney, Agent, or Firm* — Lucas & Mercanti, LLP

(57) ABSTRACT

A transmission device for an automotive vehicle, which device includes a first spur gear transmission section, a second spur gear transmission section and a plurality of double planet pins. The double planet pins extend from a first side section to a second side section. Each of the double planet pins carries one first planet of the first set of planets and one second planet of the second set of planets. A plurality of supporting pins are also provided, each of the supporting pins carrying one third planet of the third set of planets. The supporting pins extend from the first side section to the second side section.

10 Claims, 4 Drawing Sheets

AUTOMOTIVE VEHICLE TRANSMISSION DEVICE COMPRISING A SUPPORTING PIN

CROSS-REFERENCE TO RELATED APPLICATIONS

This application claims the priority of DE 10 2011 081 82.0 filed Aug. 31, 2011, which is incorporated by reference herein.

BACKGROUND OF THE INVENTION

The invention concerns a transmission device for an automotive vehicle. The device includes a first spur gear transmission section having a plurality of first planets of a first set of planets which are arranged to rotate about a main axis of rotation of the transmission device. The device further includes a second spur gear transmission section having a plurality of second planets of a second set of planets which are arranged to rotate about the main axis of rotation of the transmission device. The device further includes a plurality of double planet pins which extend from a first side section to a second side section, each of said double planet pins carrying one planet of the first set of planets and one planet of the second set of planets. The device still further includes a third set of planets having third planets which are likewise arranged to rotate about the main axis of rotation of the transmission device. The device further has a plurality of supporting pins each of which carries one planet of the third set of planets.

Transmission devices in automotive vehicles are known in a variety of different configurations. Such transmission devices are used for example in drive trains of automotive vehicles for reducing, multiplying, distributing or combining drive torques. A particularly design space-saving configuration of transmission devices are spur gear transmission devices that comprise a plurality of continuously toothed spur gears.

The publication U.S. Pat. No. 3,527,121, which probably constitutes the closest prior art, discloses a planet gear transmission comprising a plurality of axially neighboring transmission sections which comprise planets in form of spur gears. As best seen in FIG. 1, in one form of embodiment disclosed in this publication, an axially extending, continuous planet pin is used as a carrier for a double planet gear, two planet gear sections being arranged neighboring each other in axial direction on the common planet pin. Further planets of this planetary transmission comprise pins, each of which, as viewed in axial direction, extends only over one single transmission section.

SUMMARY OF THE INVENTION

The object of the invention is to propose a transmission device for an automotive vehicle, which device must have a compact and, at the same time, robust structure.

Within the framework of the invention, a transmission device is disclosed that is suitable and/or configured for use in an automotive vehicle. In particular, the transmission device serves for the multiplication, reduction, combination and/or distribution of a drive torque in the automotive vehicle. Thus, in the most general embodiment of the invention, the transmission device can be configured as a differential, particularly a longitudinal or transverse differential, a hybrid transmission, an automatic transmission etc.

In a particularly preferred form of embodiment of the invention, the transmission device is configured as an electromotive transmission device—also called electric axle—and comprises an electromotor that provides a drive torque, preferably the main drive torque for the automotive vehicle. It is particularly preferred to arrange the electromotor coaxially and/or concentrically to a main axis of rotation of the transmission device. In one possible form of embodiment, driven shafts extend coaxially and concentrically to the main axis of rotation and within the electromotor and/or transmission device.

The transmission device is configured as a spur gear transmission and comprises a plurality of continuously toothed gears. The axes of the spur gears are oriented parallel to the main axis of rotation.

The transmission device comprises a first spur gear transmission section that comprises a plurality of first planets of a first set of planets. The planets are arranged preferably evenly distributed on a common pitch circle for rotation about the main axis of rotation.

In axial direction neighboring the first spur gear transmission section, preferably directly adjoining this, is arranged a second spur gear transmission section that comprises a second set of planets comprising a plurality of second planets. The second planets are likewise arranged preferably evenly distributed on a pitch circle for rotation about the main axis of rotation. The pitch circle of the first planets is the same pitch circle as the pitch circle of the second planets.

Laterally, the two spur gear transmission sections are delimited by a first side section and a second side section. The two spur gear transmission sections arranged adjoining each other are disposed between the two side sections and are surrounded by these in axial direction after the manner of a clip. As viewed in axial direction, the first side section is arranged at the beginning and is followed by the first transmission section, then the second transmission section and, finally, the second side section.

The transmission device comprises a plurality of double planet pins each of which extends from the first side section to the second side section. Preferably, each of the double planet pins is fixed to the first side section and to the second side section, for example by fusion of materials or by positive engagement. Each of the double planet pins carries one planet of the first set of planets and one planet of the second set of planets, so that the double planet pins define a double planet axis of rotation. Preferably, the first and/or second planets are mounted through bearings, preferably rolling bearings, for rotation on the double planet pin. The radius of the pitch circle is preferably defined as the distance between the main axis of rotation and the double planet axis of rotation.

The transmission device comprises a third set of planets comprising third planets which are likewise arranged equally spaced on a pitch circle for rotation about the main axis of rotation of the transmission device. The third planets are carried by a plurality of supporting pins and are mounted on these optionally through rolling bearings. The supporting pins thus form a planet axis of rotation for the third planets. The number of planets per set of planets is, e.g. three, four or more planets.

Within the framework of the invention, it is proposed that the supporting pins should extend from the first side section to the second side section.

It is particularly preferable for each of the supporting pins to be fixed to the first side section and to the second side section.

Further, it is a particular deliberation of the invention—given an appropriate design of the transmission device and particularly a collision-free arrangement of the planets—that it should be possible for the supporting pins, not only as viewed in axial direction, to extend—as known from the prior art—not only over one of the spur gear transmission sections but over both of the spur gear transmission sections. It is indeed true that these supporting pins lengthened in axial direction are not required for receiving further planets, as is the case with the double planet pins, but these supporting pins can fulfill a supporting function and improve the mechanical stability of the transmission device in the region of the spur gear transmission sections. It is in particular the mechanical stability of the connection between the two side sections that is clearly enhanced. However, this higher stability is not achieved through reinforcements that lead to an enlargement of the design space but through a preferably design space-neutral lengthening of the supporting pins.

Seeing that the supporting pins as well as the double planet pins extend between the side sections and connect these to each other, so that the length of the supporting pins is matched to that of the double planet pins, it is preferable for the double planet pins and the supporting pins to be configured with an identical structure. Due to this preferred form of embodiment, the supporting pins and the double planet pins are identical parts. The increase of the number of identical parts in the transmission device reduces the complexity of the transmission device and the number of different individual parts while facilitating assembly.

In a particularly preferred form of embodiment of the invention, at least one of the side sections is configured as a section of a shaped part, particularly as a section of a cold-formed part. Such shaped parts are contoured sheet metal shaped parts and can be manufactured at very low costs and with low tolerances, particularly in mass production. By the use of lengthened supporting pins, an adequately high mechanical stability of the transmission device in the region of the spur gear transmission sections is achieved even in comparison to solid material parts or castings for the side sections.

The shaped part is preferably configured as a pot-shaped part which at the same time forms a housing for one or more of the sets of planets.

In a particularly preferred form of embodiment of the invention, an intermediate plate is arranged between the first and the second spur gear transmission section and forms, together with the side sections, the double planet pins and the supporting pins, a planet carrier. Particularly preferably, the intermediate plate is configured, in particular, as a sheet metal shaped part made by cold forming. This form of embodiment constitutes a consequent continuation of the approach of the invention to use, in particular, sheet metal shaped parts made by cold forming, the mechanical stability of the planet carrier being additionally assured by the use of lengthened supporting pins.

In a preferred development of the invention, the double planet pins and/or the supporting pins comprise a support shoulder against which the intermediate plate bears in axial direction by positive engagement. In this embodiment, the double planet pins and/or the supporting pins also fulfill, in addition to the carrier function for the planets and the supporting function for the side sections, a supporting function for the central intermediate plate. A support shoulder of the aforesaid type can be made in a simple and cost-effective manner and, at the same time, with high precision during the manufacturing of the double planet pins and the supporting pins.

It is particularly preferable to configure the planet carrier together with the spur gear transmission sections as a self-retaining structural group. In this embodiment, the structural group can be particularly simply mounted and maintained and, if need be, replaced.

In a particularly preferred form of embodiment of the invention, the double planet pins and/or the supporting pins comprise axially extending lubricant ducts. In this way, a further function, namely a lubricant conducting function, is fulfilled by the double planet pins and/or the supporting pins. The lubricant ducts can be configured for lubricating the bearings of the planets, particularly of the planets of the first, the second and/or the third set of planets and/or for the axial conveyance of lubricant through the transmission device in the region of the spur gear transmission sections. For instance, the double planet pins and/or the supporting pins comprise a coaxial through-bore for enabling lubricant conveyance. Alternatively or additionally, radially extending channels are provided for supplying lubricant to the bearings of the planets.

In particular, the axial conveyance of lubricant through the transmission device in the region of the spur gear transmission sections can be improved through the lubricant ducts in the supporting pins because these can constitute complementary channels to the lubricant ducts in the double planet pins. It is, however, also possible to provide lubricant ducts only in the supporting pins.

In a particularly preferred form of embodiment of the invention, the lubricant ducts in the supporting pins are configured such that the lubricant, starting from a lubricant inlet, can be conveyed through one of the spur gear transmission sections to the third planets in the other one of the spur gear transmission sections. It is thus also possible to arrange the lubricant duct on that axial side of the transmission device that is turned away from the spur gear transmission section comprising the third planets.

Lubricant conveyance can be realized, for instance, through a fitted lubricant collecting dish. In a preferred embodiment of the invention, the lubricant collecting dish comprises axially extending nozzles that are in fluidic communication with the lubricant ducts of the double planet pins and/or the supporting pins. In some forms of embodiment, the lubricant collecting dish comprises a continuous edge in which, due to centrifugal forces, lubricant is captured and pressed in, said edge being configured such that the lubricant is transported from the edge into the nozzles and thus further into the lubricant duct.

In a particularly preferred form of embodiment of the invention, the spur gear transmission section comprising the third planets is configured as a differential or as a Ravigneaux-type assembly. In these embodiments, the planets of the third set of planets mesh with the planets of the first or of the second set of planets in the spur gear transmission section.

Further features, advantages and effects of the invention will become evident from the following description of preferred examples of embodiment of the invention and from the appended figures.

BRIEF DESCRIPTION OF THE INVENTION

DETAILED DESCRIPTION OF THE INVENTION

Figure 1:
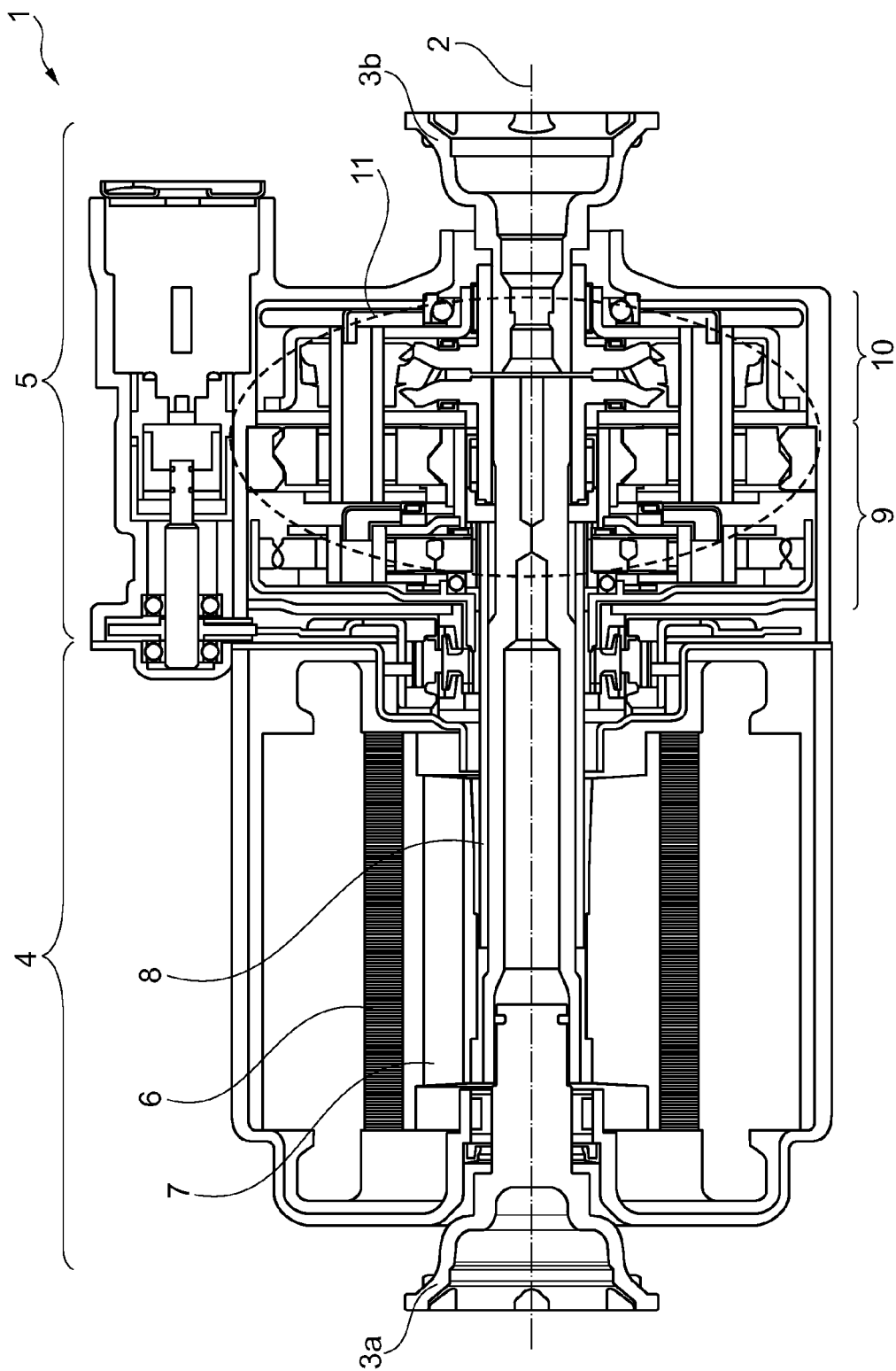
FIG. 1 shows a schematic longitudinal section through an electromotive transmission device as an example of embodiment of the invention.

FIG. 1 shows a transmission device 1 in a schematic longitudinal section through the main axis of rotation 2 of the transmission device 1 as an example of embodiment of the invention.

The transmission device 1 is configured as an electric axle or electromotive transmission device 1 comprising two driven shafts 3a and 3b that rotate about the main axis of rotation 2. The transmission device 1 comprises a motor region 4 and a transmission region 5. In the motor region 4 is arranged an electromotor 6 whose rotor 7 is coupled to the transmission region 5 through a hollow shaft 8, so that a drive torque from the electromotor 6 can be transmitted through the hollow shaft 8 into the transmission region 5. The driven shaft 3a is arranged within the hollow shaft 8, coaxially and/or concentrically to the electromotor 6.

Figure 2:
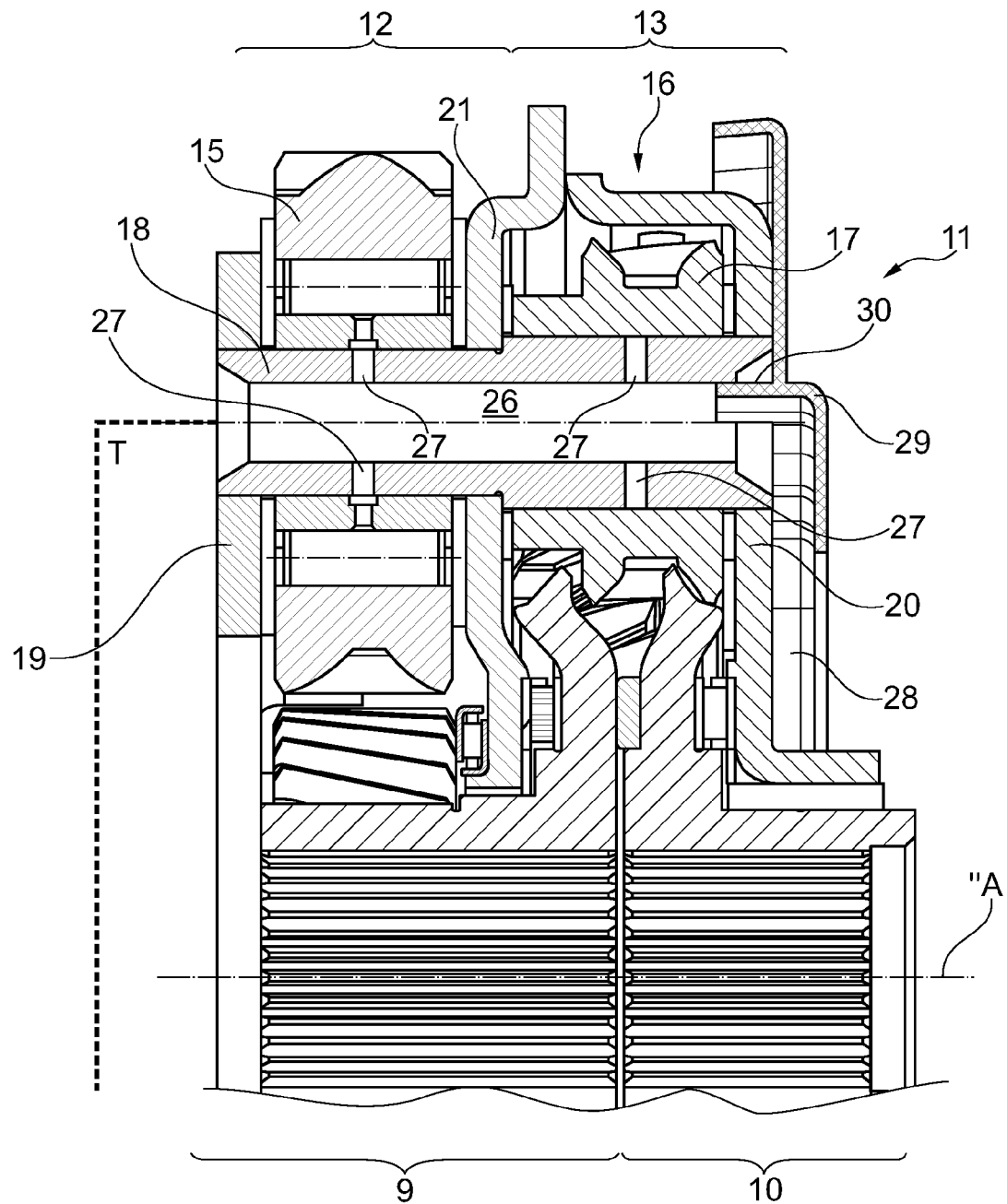
FIG. 2 shows a structural group of the transmission device in a detail view of the schematic longitudinal section of FIG. 1 in a different representation.

A multiplication section 9 and a differential section 10 are arranged in the transmission region 5 to multiply or reduce the drive torque of the electromotor 6 and to distribute this torque to the driven shafts 3a and 3b. A part of the transmission section 9 and of the differential section 10 are integrated in a common structural group 11 which is shown on an enlarged scale in a schematic longitudinal section in FIG. 2. The illustration of FIG. 2 shows the structural group 11 in a longitudinal sectional representation, the lower half of the structural group 11 being omitted in the drawing.

The structural group 11 comprises a first spur gear transmission section 12 and, neighboring this in axial direction of the main axis of rotation 2, a second spur gear transmission section 13. The first spur gear transmission section 12 is configured as a part of the transmission section 9 and comprises a first set 14 of planets comprising first planets 15 that are arranged, distributed in peripheral direction about the main axis of rotation 2, in a pitch circle T.

The second spur gear transmission section 13 forms the differential section 10 and comprises a second set 16 of planets comprising second planets 17 that are likewise arranged in peripheral direction on the pitch circle T.

One planet 15 of the first set 14 of planets and one second planet 17 of the second set 16 of planets are seated, in each case, on a double planet pin 18. The structural group 11 is delimited laterally or in axial direction by two side sections 19, 20 in which ends of the double planet pin or pins 18 are fixed. An intermediate plate 21 is arranged between the first and the second spur gear transmission sections 12, 13 and serves to separate the two spur gear transmission sections 12, 13 from each other. Both the side sections 19, 20, as also the intermediate plate 21, are configured as sheet metal parts or as contoured sheet metal shaped parts. The side sections 19, 20 and the intermediate plate 21 can thus be manufactured through a cost-effective cold forming method.

Figure 3:
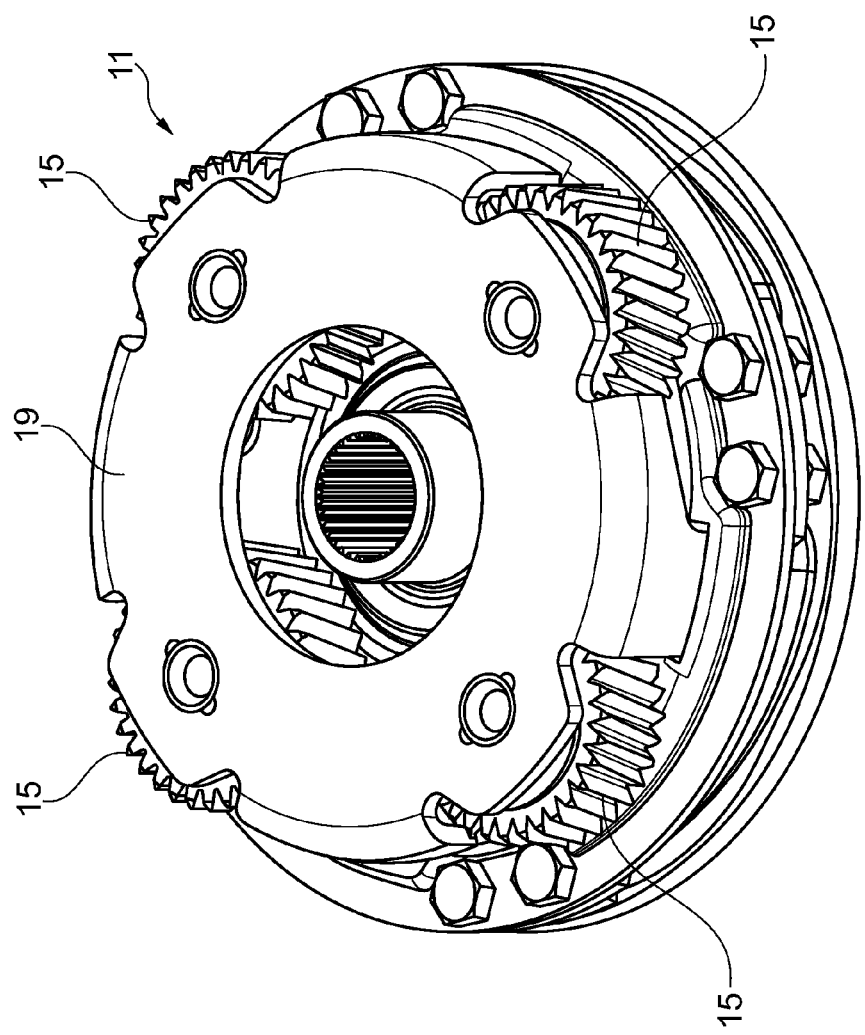
FIG. 3 shows a schematic three-dimensional representation of the structural group of FIG. 2.

FIG. 3 shows the structural group 11 in a schematic three-dimensional representation in which it can be seen that the first side section 19 has a pot shape and receives the four first planets 15. The first planets 15 project out of recesses made in the first side section 19, so that the first planets 15 can mesh with an annulus of the transmission section 9.

Figure 4:
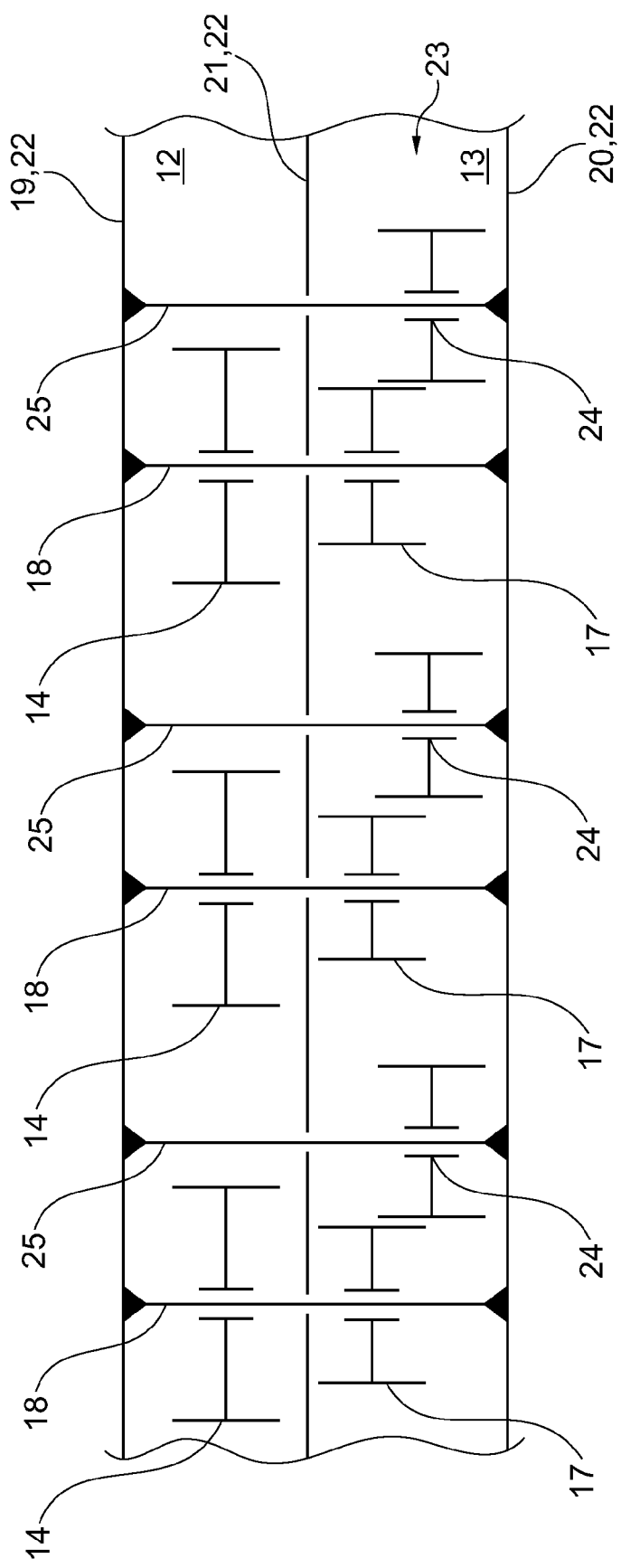
FIG. 4 shows a schematic illustration of the planet carrier of the structural group of FIGS. 2 and 3 in a developed view.

FIG. 4 shows a schematic representation of the structural group 11 in a developed view in which it can be seen that the first side section 19 and the second side section 20 form, together with the double planet pins 18, a planet carrier 22.

But in this illustration, it can also be seen that a third set 23 of planets comprising third planets 24 is arranged in the second spur gear transmission section 13. Each of the third planets 24 of the third set 23 of planets meshes with a second planet 17 of the second set 16 of planets. Each of the third planets 24 of the third set 23 of planets is seated on a supporting pin 25 which extends from the first side section 19 through the intermediate plate 21 to the second side section 20. The region of the supporting pin 25 in the first spur gear transmission section 12 is vacant.

Both the double planet pins 18 as well as the supporting pins 25 are firmly connected to the side sections 19, 20, for example, by welding and thus form a mechanical support between the side sections 19, 20. Due to the fact that the supporting pins 25 extend over die entire axial width of the structural group 11, the planet carrier 22 is mechanically very stable and can therefore take up high loads.

The double planet pins 18 define a double planet axis of rotation and the supporting pins 25 define a supporting pin axis of rotation for the fitted planets 15, 17, 24, the double planet axis of rotation, the supporting pin axis of rotation and the main axis of rotation 2 being oriented parallel to one another.

The double planet pins 18 and the supporting pins 25 both comprise a lubricant duct 26 extending in axial direction and shown by way of example in the double planet pin 18 in FIG. 2. The lubricant ducts 26 in the supporting pins 25 are identically configured. The lubricant duct 26 extends through the entire structural group 11, so that lubricant can be conveyed through both the spur gear transmission section 12, 13 in axial direction. Due to the fact that both the double planet pins 18 as also the supporting pins 25 comprise a lubricant duct 26, the flow resistance all through the structural group 11 is kept at a low level, so that an effective lubricant supply is assured.

In addition, the double planet pins 18 comprise channels 27 which branch off the lubricant duct 26 in radial direction and supply lubricant to the bearings of the planets 15, 17 and 24. On the second side section 20 is fitted a lubricant collecting dish 28 that comprises a continuous edge 29 that is open radially inwards and in which, during operation of the structural group 11, due to centrifugal forces, lubricant is captured and conveyed through nozzles 30 into the lubricant ducts 26. Because of the lubricant ducts 26, it suffices to introduce lubricant into the structural group 11 only from one axial side but, in spite of this, both the spur gear transmission sections 12 and 13 are still adequately supplied with lubricant.

LIST OF REFERENCE NUMERALS

1 Transmission device
2 Main axis of rotation
3a, b Driven shafts
4 Motor region
5 Transmission region
6 Electromotor
7 Rotor
8 Hollow shaft
9 Multiplication section
10 Differential section
11 Structural group
12 First spur gear transmission section
13 Second spur gear transmission section
14 First set of planets
15 First planets
16 Second set of planets
17 Second planets
18 Double planet pins
19 Side section
20 Side section 21 Intermediate plate
22 Planet carrier
23 Third set of planets
24 Third planets
25 Supporting pins
26 Lubricant duct
27 Channels
28 Lubricant collecting dish
29 Edge
30 Nozzle

The invention claimed is:

1. A transmission device for an automotive vehicle, comprising:
   a first spur gear transmission section, said first spur gear transmission section including a plurality of first planets of a first set of planets which are arranged for rotation about a main axis of rotation of the transmission device;
   a second spur gear transmission section, including a plurality of second planets of a second set of planets which are arranged for rotation about the main axis of rotation of the transmission device;
   a plurality of double planet pins that extend from a first side section to a second side section, each of said double planet pins carrying one first planet of the first set of planets and one second planet of the second set of planets;
   a third set of planets including third planets arranged for rotation about the main axis of rotation of the transmission device; and
   a plurality of supporting pins, each of said supporting pins being arranged to carry one of the third planets of the third set of planets, wherein said supporting pins extend from the first side section to the second side section.

2. The transmission device according to claim 1, wherein at least one of the side sections is configured as a section of a shaped part.

3. The transmission device according to claim 2, wherein the shaped part is configured as a pot-shaped part.

4. The transmission device according to claim 2, further comprising an intermediate plate arranged between the first and the second spur gear transmission sections, which intermediate plate forms, together with the side sections, the double planet pins and the supporting pins, a planet carrier.

5. The transmission device according to claim 4, wherein the double planet pins and/or the supporting pins comprise a support shoulder against which the intermediate plate bears by positive engagement in an axial direction.

6. The transmission device according to claim 4, wherein the planet carrier is configured together with the spur gear transmission sections as a self-retaining structural group.

7. The transmission device according to claim 1, wherein the double planet pins and/or the supporting pins comprise axially extending lubricant ducts.

8. The transmission device according to claim 7, wherein the lubricant ducts are configured for lubricating bearings of the planets and/or for an axial passage of lubricant.

9. The transmission device according to claim 7, wherein the lubricant duct is arranged to lead through one of the spur gear transmission sections to the third planets in the other of the spur gear transmission sections.

10. The transmission device according to claim 1, wherein the second spur gear transmission section is configured, together with the third planets, as a differential or as a Ravigneaux-type assembly.

* * * * *